United States Patent
Pannell

(10) Patent No.: US 8,824,489 B1
(45) Date of Patent: Sep. 2, 2014

(54) PHYSICAL LAYER (PHY) DEVICES FOR USE IN AUTOMOTIVE AND INDUSTRIAL APPLICATIONS

(75) Inventor: Donald Pannell, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 184 days.

(21) Appl. No.: 13/455,279

(22) Filed: Apr. 25, 2012

Related U.S. Application Data

(60) Provisional application No. 61/479,335, filed on Apr. 26, 2011.

(51) Int. Cl.
*H04L 12/28* (2006.01)

(52) U.S. Cl.
USPC .......................................................... 370/401

(58) Field of Classification Search
CPC ... H04L 12/50; H04L 12/2805; H04L 12/282; H04L 12/2838
USPC ........... 370/351, 389, 400, 401; 709/223, 224
See application file for complete search history.

(56) References Cited

U.S. PATENT DOCUMENTS

| | | | | |
|---|---|---|---|---|
| 7,039,711 B2 * | 5/2006 | Hsu et al. | ....................... | 709/228 |
| 7,299,290 B2 * | 11/2007 | Karpoff | ......................... | 709/231 |
| 7,599,391 B1 * | 10/2009 | Lo | ................... | 370/465 |
| 7,865,744 B2 * | 1/2011 | Lee et al. | ....................... | 713/300 |
| 7,984,190 B2 * | 7/2011 | Rhoads | ......................... | 709/248 |
| 8,204,432 B2 * | 6/2012 | Girard et al. | .................. | 455/3.02 |
| 2003/0191883 A1 * | 10/2003 | April | .............................. | 710/305 |
| 2007/0147412 A1 * | 6/2007 | Wei et al. | ....................... | 370/463 |
| 2009/0154455 A1 * | 6/2009 | Diab | ............................. | 370/389 |
| 2010/0150285 A1 * | 6/2010 | Tazebay et al. | ................ | 375/346 |
| 2011/0022699 A1 * | 1/2011 | Powell et al. | .................. | 709/224 |

\* cited by examiner

*Primary Examiner* — Chi Pham
*Assistant Examiner* — Robert Lopata

(57) ABSTRACT

A system including a physical layer (PHY) module configured to operate in a first mode and a second mode. In the first mode, the PHY module is configured to be connected to a first physical medium including a first number of wire pairs, and is configured to communicate over the first physical medium at a first data rate. In the second mode, the PHY module is configured to be connected to a second physical medium including a second number of wire pairs that is less than the first number of wire pairs, and is configured to communicate over the second physical medium at the first data rate. A mode control module is configured to selectively transition the PHY module between the first mode and the second mode.

18 Claims, 4 Drawing Sheets

PHYSICAL LAYER (PHY) DEVICES FOR USE IN AUTOMOTIVE AND INDUSTRIAL APPLICATIONS

CROSS-REFERENCE TO RELATED APPLICATIONS

This disclosure claims the benefit of U.S. Provisional Application No. 61/479,335, filed on Apr. 26, 2011, which is incorporated herein by reference in its entirety.

FIELD

The present disclosure relates to physical layer devices in automotive and industrial applications.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Passenger vehicles such as cars and buses my include cables for Ethernet or other wired local area network applications. The vehicles may include one or more minimum performance and/or physical requirements for the type of cables and corresponding physical layer devices used. For example, the cables and physical layer devices may be subject to requirements including, but not limited to, maximum length and wire thickness requirements, electromagnetic interference requirements (e.g., both tolerance of electromagnetic interference and low emission of electromagnetic interference), and various automotive silicon requirements (e.g., minimum time between failures).

SUMMARY

A system including a physical layer (PHY) module configured to operate in a first mode and a second mode. In the first mode, the PHY module is configured to be connected to a first physical medium including a first number of wire pairs, and is configured to communicate over the first physical medium at a first data rate. In the second mode, the PHY module is configured to be connected to a second physical medium including a second number of wire pairs that is less than the first number of wire pairs, and is configured to communicate over the second physical medium at the first data rate. A mode control module is configured to selectively transition the PHY module between the first mode and the second mode.

A method including, in a first mode, configuring a physical layer (PHY) module to be connected to a first physical medium including a first number of wire pairs, and to communicate over the first physical medium at a first data rate. The method includes, in a second mode, configuring the PHY module to be connected to a second physical medium including a second number of wire pairs that is less than the first number of wire pairs, and to communicate over the second physical medium at the first data rate. The method further includes selectively transitioning the PHY module between the first mode and the second mode.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings.

DESCRIPTION

Cables, physical layer (PHY) devices, and other devices used for Ethernet or other wired local area network (LAN) applications may be subject to certain physical and performance requirements for use in passenger vehicles. Further, the cables and devices may be subject to these requirements while also being subject to minimum speed requirements (e.g., 100 megabits per second, or Mb/s). Structural and other performance difficulties are associated with increasing the speed (e.g., to 1 gigabit per second, or Gb/s). For example, increasing the speed may correspond to additional twisted wire pairs and/or thicker wires that adversely affect one or more other performance requirements (e.g., increased weight leading to lower fuel economy, and increased power dissipation and heat).

A PHY device according to one aspect of the present disclosure is configured to operate in a plurality of modes to increase the speed associated with Ethernet communication in the vehicle while still meeting the other physical and performance requirements for vehicle applications.

Figure 1:
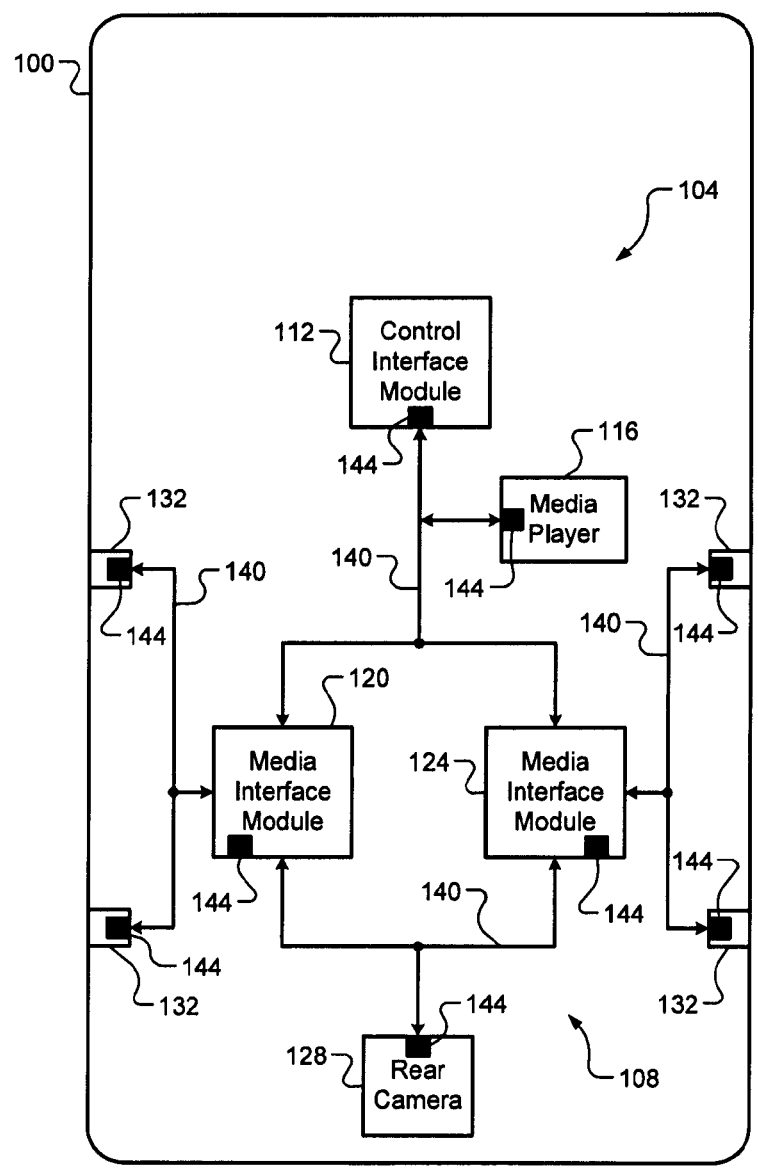
FIG. 1 is a functional block diagram of a vehicle according to the principles of the present disclosure.

FIG. 1 illustrates a vehicle 100 including a wired Ethernet LAN 104. The LAN 104 includes a plurality of devices 108 including, but not limited to, a control interface module 112, a portable media player (e.g., an MP3 player) 116, media interface modules 120 and 124, a rear camera 128, and perimeter cameras 132. The control interface module 112 may include a display and a user interface for a driver and/or a passenger to control the devices 108 and various other functions of the vehicle 100 such as a navigation system, a radio, HVAC, etc.

The media interface modules 120 and 124 may each include a display and/or speakers and a user interface for viewing and/or listening to multimedia content such as video (e.g., video provided by removable media such as Blu-ray video, streamed video, or video stored digitally within the vehicle 100) and audio (e.g., audio provided by the media player 116). For example only, the media interface modules 120 and 124 may be arranged for use by passengers in a rear portion of the vehicle 100. Further, audio output devices (not shown) may be arranged throughout the vehicle 100 to provide surround sound and/or radio output. The control interface module 112 and/or the media interface modules 120 and 124 may also display video provided from rear camera 128 and the perimeter cameras 132. For example, the rear camera 128 may be a backup camera.

The devices 108 are distributed in different locations throughout the vehicle 100. Accordingly, the devices 108 may communicate via cables 140 such as unshielded twisted pair (UTP) Ethernet cables. Each of the cables 140 may include 1 pair, 2 pairs, or 4 pairs of UTP wires. Further, each of the devices 108 may be associated with (e.g., include) a respective network switch 144 including one or more interface ports. Each of the interface ports of the switches 144 supports communication between the devices 108 in the LAN 104 using the cables 140. For example, each of the interface ports of the switches 144 includes a PHY device (not shown in FIG. 1; see FIG. 2) that provides an interface between the switch 144 and the cables 140.

The interface ports of the switches 144 are configurable to operate in a plurality of modes. For example, the respective PHY devices of the interface ports of the switches 144 may operate in a first mode using a first number of pairs of wires (e.g., 4 pairs) at a speed of 1 Gb/s following the IEEE 802.3z standard or another Gigabit Ethernet (GE) speed. In some applications, the PHY devices may operate in a second mode using a second, reduced number of pairs of wires (e.g., 2 pairs) at the same speed of 1 Gb/s. In other words, in the second mode, fewer pairs of wires are used, but a data rate associated with the remaining cables is increased to maintain the speed of 1 Gb/s. Accordingly, the interface ports of the switches 144 may be used with fewer pairs of wires to meet performance requirements associated with network communication within the vehicle 100 while also reducing cost, thickness, and weight of the cables 140.

Figure 2:
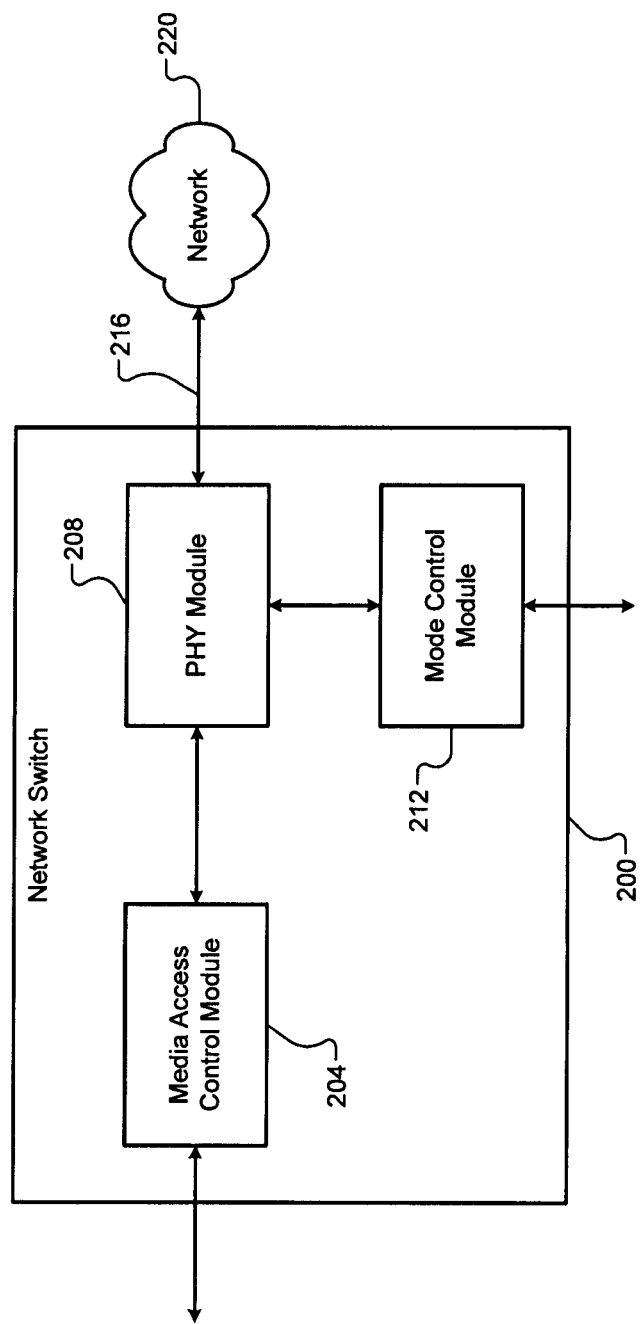
FIG. 2 is a functional block diagram of a network switch according to the principles of the present disclosure.

FIG. 2 illustrates a network switch interface port 200 including a media access control (MAC) module 204, a PHY module 208, and a mode control module 212. The PHY module 208 transmits data to and receives data from the MAC module 204, and communicates with a corresponding device associated with the network switch interface port 200 (e.g., one of the devices 108 as shown in FIG. 1) via the MAC module 204. The PHY module 208 is connected to a physical medium 216 and communicates with a network 220 via the physical medium 216. For example, the physical medium 216 includes 1 pair, 2 pairs, or 4 pairs of cables. The physical medium 216 may include 2 or 4 pairs of category 5 (CAT 5e) cable.

The PHY module 208 is configured to operate in at least two modes, including, for example only, a 2 pair mode and a 4 pair mode. When the physical medium 216 includes 4 pairs of wire, the PHY module 208 operates in the 4 pair mode. In the 4 pair mode, the PHY module 208 communicates with the network 220 over 4 pairs of wire at a GE speed such as 1 Gb/s. Conversely, if the physical medium 216 includes only 2 pairs of wire, the PHY module 208 operates in the 2 pair mode. In the 2 pair mode, the PHY module 208 still communicates with the network 220 at 1 Gb/s. However, the PHY module 208 communicates at 1 Gb/s using only the 2 pairs of wire. For example, in the 4 pair mode, each pair may communicate at a speed of 250 Mb/s to reach 1 Gb/s. In the 2 pair mode, the data rate is increased over the pairs of wires such that each of the 2 pairs of wire communicates at a speed of 500 Mb/s to reach 1 Gb/s. For example only, a clock frequency associated with the PHY module 208 may be increased (e.g., doubled) to maintain the 1 Gb/s data rate. In each mode, PAM-5 pulse amplification modulation may be used.

Accordingly, the PHY module 208 maintains the data rate of 1 Gb/s while reducing the number of pairs of wire used. Further, a size of connectors associated with the physical medium 216 may be reduced to accommodate the fewer number of pairs of wire.

The mode control module 212 may select the operating mode (e.g., the 2 pair mode or the 4 pair mode) of the PHY module 208. For example, a manufacturer of the vehicle including the network switch interface port 200, a manufacturer of the network switch interface port 200, and/or a manufacturer of the PHY module 208 may select the operating mode using an interface 240. For example only, the mode control module 212 may be programmed to select the operating mode based on an intended application of the PHY module 208. In other words, for an application where the PHY module 208 will be connected to 4 pairs of wire, the mode control module 212 may be programmed to select the 4 pair mode. Conversely, for an application where the PHY module 208 will be connected to 2 pairs of wire (e.g., in automotive or industrial applications where only 2 pairs of wire are desired), the mode control module 212 may be programmed to select the 2 pair mode. Or, the mode control module 212 may be configured to automatically detect a number of pairs of wire connected to the PHY module 208. Accordingly, the mode control module 212 may automatically select the operating mode based on the detected number of pairs of wire.

Figure 3A:
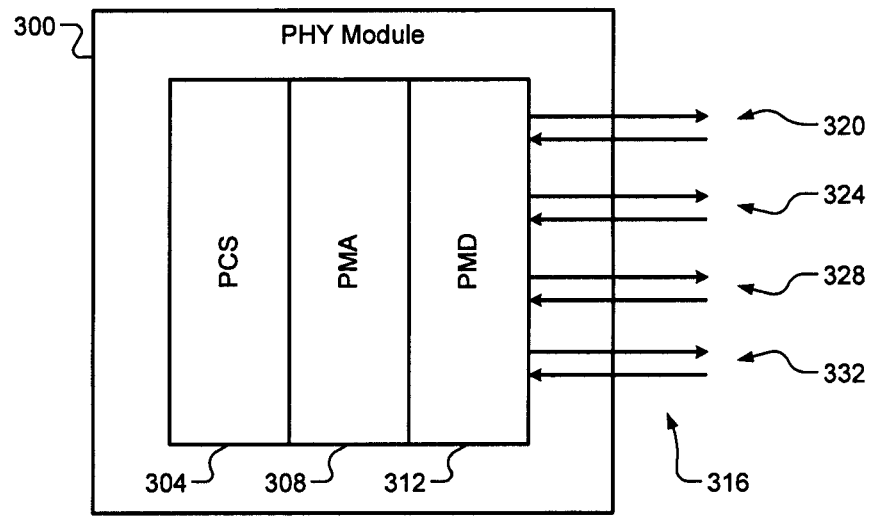
FIGS. 3A and 3B illustrate a physical layer (PHY) module according to the principles of the present disclosure.
Figure 3B:
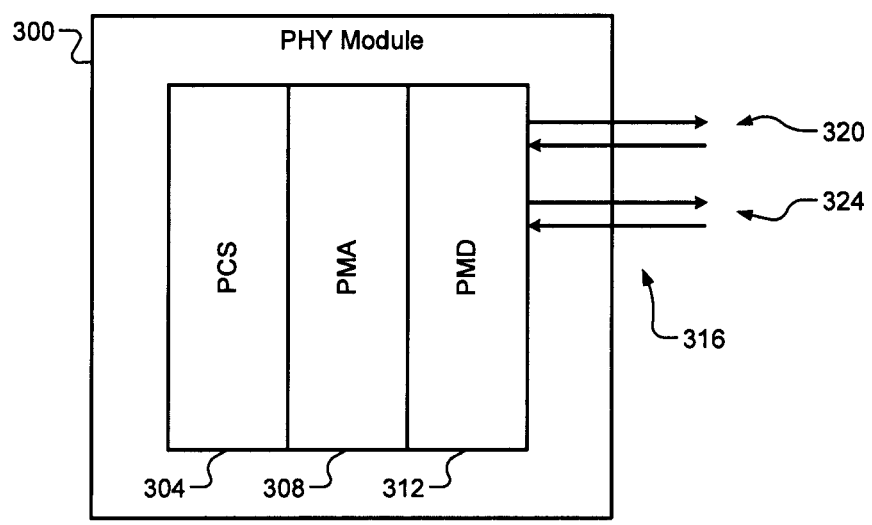

FIGS. 3A and 3B illustrate a PHY module 300, in which the PHY module 300 includes a physical coding sub-layer (PCS) 304, a physical media attachment layer (PMA) 308, and a physical media dependent layer (PMD) 312. The PCS 304 encodes data for transmission over a physical medium 316 and decoded data received over the physical medium 316, and may perform autonegotiation. The PMA 308 performs framing, synchronization, and detection. The PMD 312 includes a transceiver and other circuitry for communicating with the physical medium 316.

Referring to FIG. 3A, the PHY module 300 is shown connected to 4 pairs of wire 320, 324, 328, and 332. Accordingly, in FIG. 3A, the PHY module 300 is configured to operate in the 4 pair mode. Conversely, in FIG. 3B, the PHY module 300 is shown connected to 2 pairs of wire 320 and 324. Accordingly, in FIG. 3B, the PHY module 300 is configured to operate in the 2 pair mode.

In each of the 2 pair mode and the 4 pair mode, the PHY module 300 performs echo cancelling. Increasing the data rate on the physical medium (e.g., increasing the data rate on the 2 pairs of wire 320 and 324 in the 2 pair mode) may require a greater number of echo taps or a shorter cable to provide sufficient echo cancelling. For example, a standard number of echo taps for the PHY module 300 may support a cable length of 130 meters or more. Increasing the data rate on the 2 pairs of wire 320 and 324 may reduce the supported cable length to approximately 50 meters. However, in automotive applications, cables having lengths greater than 50 meters are typically not used. Accordingly, the PHY module 300 may still effectively perform echo cancelling in the 2 pair mode without additional echo taps.

Further, echo taps used by the pairs 328 and 332 may be used by the pairs 320 and 324 in the 2 pair mode. For example, in the 4 pair mode, each of the pairs of wire 320, 324, 328, and 332 is associated with respective echo taps. Conversely, in the 2 pair mode, echo taps associated with the pairs 328 and 332 may be unused. Accordingly, if a cable having a length greater than a threshold (e.g., 50 meters) is used in the 2 pair mode, the PHY module 300 may use the echo taps associated with the pairs 328 and 332 to perform echo cancelling on the pairs 320 and 324. For example, the PHY module 300 may perform cable length detection to determine an approximate length of the pairs of wire 320 and 324. If the determined cable length is less than or equal to the threshold, the PHY module 300 may perform echo cancelling on the pairs of wire 320 and 324 using only the echo taps associated with the pairs of wire 320 and 324. If the determined cable length is greater than the threshold, the PHY module may perform echo cancelling on the pairs of wire 320 and 324 using both the echo taps associated with the pairs of wire 320 and 324 as well as the echo taps associated with the pairs of wire 328 and 332.

Figure 4:
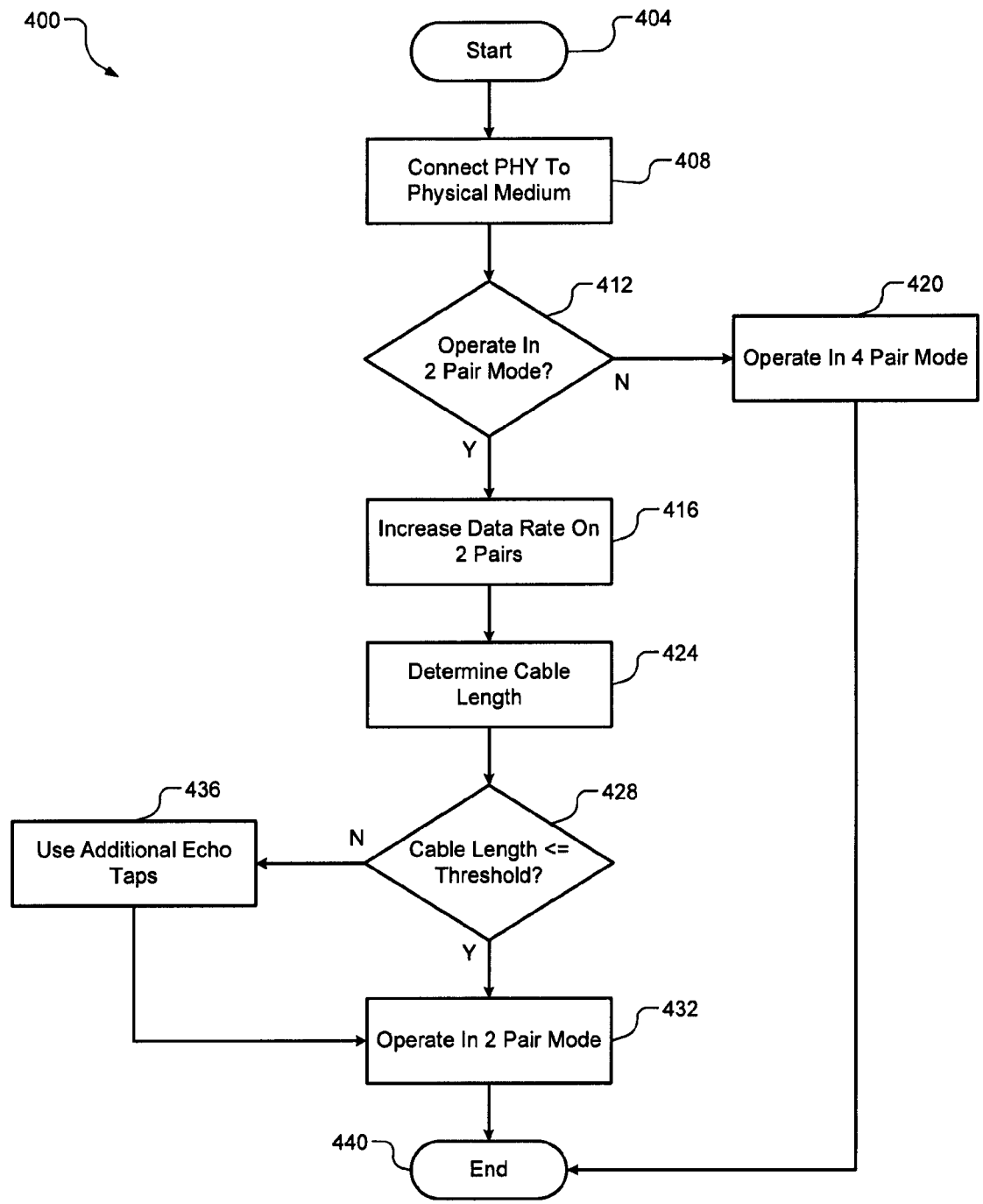
FIG. 4 illustrates a method of operating a PHY module according to the principles of the present disclosure.

FIG. 4 illustrates a method 400 of operating a PHY module in accordance with one embodiment. The method 400 begins at 404. At 408, the PHY module is connected to a physical medium. At 412, the method 400 determines whether to operate in a 2 pair mode. For example, the method 400 may automatically detect a number of pairs of wire connected to the PHY module, or may be programmed to operate in one of the modes. If true, the method 400 continues to 416. If false, the method 400 continues to 420. At 420, the method 400 operates in a 4 pair mode.

At 416, the method 400 increases a data rate of pairs of wire being used in the 2 pair mode. For example, the method 400 increases a clock frequency of the PHY module to increase the data rate. At 424, the method 400 determines a cable length associated with the pairs of wire. At 428, the method 400 determines whether the cable length is less than or equal to a threshold. If true, the method 400 continues to 432. If false, the method 400 continues to 436. At 436, the method 400 configures the PHY module to perform echo cancelling using additional echo taps associated with the 4 pair mode. At 432, the method 400 operates in the 2 pair mode. The method 400 ends at 440.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The invention claimed is:

1. A system, comprising:
   a physical layer (PHY) module configured to operate in a first mode or a second mode based on a determination of whether a first number of wire pairs or a second number of wire pairs is connected to the PHY module, wherein:
      while operating in the first mode, the PHY module is i) configured to be connected to a first physical medium including the first number of wire pairs, and ii) is configured to communicate over the first physical medium at a first data rate using the first number of wire pairs; and
      while operating in the second mode, the PHY module is i) configured to be connected to a second physical medium including a second number of wire pairs that is less than the first number of wire pairs, and ii) is configured to increase a transmission rate using the second number of wire pairs to communicate over the second physical medium at the first data rate, wherein the first data rate using the first number of wire pairs and the first data rate using the second number of wire pairs correspond to a same data rate; and
   a mode control module configured to selectively transition the PHY module between the first mode and the second mode.

2. The system of claim 1, wherein i) the first number is four, and ii) the second number is two.

3. The system of claim 1, wherein the first data rate is one Gigabit per second.

4. The system of claim 1, wherein the PHY module is configured to i) operate according to a first clock frequency in the first mode, and ii) operate according to a second clock frequency in the second mode, wherein the second clock frequency is greater than the first clock frequency.

5. The system of claim 1, wherein the mode control module is configured to i) determine whether the first number of wire pairs or the second number of wire pairs is connected to the PHY module, and ii) select between the first mode and the second mode based on the determination.

6. The system of claim 1, wherein the PHY module is configured to, while operating in the second mode, i) determine a cable length associated with the second physical medium, and ii) based on the determination of the cable length, perform echo cancelling on the second number of wire pairs using echo taps associated with the first number of wire pairs.

7. The system of claim 1, further comprising a network switch, wherein the network switch includes:
   the PHY module; and
   the mode control module.

8. The system of claim 7, further comprising a vehicle, wherein the vehicle includes a plurality of the network switches.

9. The system of claim 8, wherein the vehicle further includes:
   a plurality of devices operating in a local area network within the vehicle, wherein each of the plurality of the network switches is associated with a respective one of the plurality of devices; and
   a plurality of network cables connecting the plurality of devices, wherein each of the plurality of network cables includes the second number of wire pairs, and wherein the second number is two.

10. A method, comprising:
  operating a physical layer (PHY) module in a first mode or a second mode based on a determination of whether a first number of wire pairs or a second number of wire pairs is connected to the PHY module, wherein
    while the PHY module is operating in the first mode, the PHY module is configured i) to be connected to a first physical medium including the first number of wire pairs, and ii) to communicate over the first physical medium at a first data rate using the first number of wire pairs; and
    while the PHY module is operating in the second mode, the PHY module is configured i) to be connected to a second physical medium including a second number of wire pairs that is less than the first number of wire pairs, and ii) to increase a transmission rate using the second number of wire pairs to communicate over the second physical medium at the first data rate, wherein the first data rate using the first number of wire pairs and the first data rate using the second number of wire pairs correspond to a same data rate; and
  selectively transitioning the PHY module between the first mode and the second mode.

11. The method of claim 10, wherein i) the first number is four, and ii) the second number is two.

12. The method of claim 10, wherein the first data rate is one Gigabit per second.

13. The method of claim 10, further comprising:
  operating the PHY module according to a first clock frequency in the first mode; and
  operating the PHY module according to a second clock frequency in the second mode, wherein the second clock frequency is greater than the first clock frequency.

14. The method of claim 10, further comprising:
  determining whether the first number of wire pairs or the second number of wire pairs is connected to the PHY module; and
  selecting between the first mode and the second mode based on the determination.

15. The method of claim 10, further comprising:
  while operating in the second mode,
    determining a cable length associated with the second physical medium; and
    based on the determination of the cable length, performing echo cancelling on the second number of wire pairs using echo taps associated with the first number of wire pairs.

16. The method of claim 10, further comprising arranging the PHY module on a network switch.

17. The method of claim 16, further comprising arranging a plurality of the network switches in a vehicle.

18. The method of claim 17, further comprising:
  associating each of the plurality of the network switches with a respective one of a plurality of devices operating in a local area network within the vehicle; and
  connecting the plurality of devices using a plurality of network cables, wherein each of the plurality of network cables includes the second number of wire pairs, and wherein the second number is two.

* * * * *